(12) United States Patent  (10) Patent No.: US 7,284,531 B2
Brachert et al.  (45) Date of Patent: Oct. 23, 2007

(54) METHOD FOR OPERATING AN INTERNAL COMBUSTION ENGINE

(75) Inventors: Götz Brachert, Stuttgart (DE); Rüdiger Herweg, Esslingen (DE); Kai Kanning, Stuttgart (DE); Matthias Pfau, Ludwigsburg (DE); Jochen Schäflein, Stuttgart (DE); Hans-Jürgen Weimann, Oppenweiler (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 11/389,662

(22) Filed: Mar. 24, 2006

(65) Prior Publication Data

US 2006/0201476 A1  Sep. 14, 2006

Related U.S. Application Data

(63) Continuation-in-part of application No. PCT/EP2004/00829, filed on Sep. 3, 2004.

(30) Foreign Application Priority Data

Sep. 25, 2003  (DE) ................ 103 44 428

(51) Int. Cl.
*F02B 3/04* (2006.01)
(52) U.S. Cl. ............... 123/295; 123/299; 123/305
(58) Field of Classification Search ........ 123/299–300, 123/305, 295, 436, 568.11, 568.14, 90.15
See application file for complete search history.

(56) References Cited

U.S. PATENT DOCUMENTS 4,836,161 A * 6/1989 Abthoff et al. ............ 123/299
6,213,086 B1 * 4/2001 Chmela et al. ............ 123/276
6,336,436 B1 1/2002 Miyakubo et al.
6,354,264 B1 * 3/2002 Iwakiri et al. ............ 123/305
6,390,054 B1 * 5/2002 Yang ....................... 123/295
6,425,367 B1 7/2002 Hiraya et al.
6,513,487 B1 * 2/2003 Jorach et al. ............. 123/299
6,619,254 B2 * 9/2003 Chmela et al. ............ 123/276
6,715,464 B2 * 4/2004 Heimberg ................. 123/300
6,736,106 B2 * 5/2004 Reitz et al. ............... 123/316
6,820,415 B2 * 11/2004 Abet et al. .................. 60/286
6,840,209 B2 * 1/2005 Shimazaki ................ 123/276
7,044,104 B2 * 5/2006 Juretzka et al. ........... 123/299
7,168,420 B1 * 1/2007 Yang .................... 123/568.15
7,194,996 B2 * 3/2007 Koopmans ................ 123/295
2001/0015192 A1 8/2001 Urushihara et al.
2002/0046741 A1 4/2002 Kakuho et al.
2006/0196467 A1 * 9/2006 Kang et al. ............... 123/305
2006/0196468 A1 * 9/2006 Chang et al. ............. 123/305
2006/0196469 A1 * 9/2006 Kuo et al. ................. 123/305
2006/0201479 A1 * 9/2006 Brachet et al. ............ 123/305
2006/0213193 A1 * 9/2006 Koopmans ................. 60/602

FOREIGN PATENT DOCUMENTS

DE  198 18 569  11/1989

(Continued)

*Primary Examiner*—Hai Huynh
(74) *Attorney, Agent, or Firm*—Klaus J. Bach (57) ABSTRACT

In a method for operating an internal combustion engine in which the fuel is injected into a combustion chamber of a pre-injection and a main injection quantity, the quantity of fuel for the pre-injection, which is selected depending on the combustion location, is injected before the top dead center of the gas exchange, and the fuel for the main injection is injected synchronously with the induction of the air. The method is used in connection with internal combustion engines, in particular for passenger and commercial motor vehicles.

5 Claims, 6 Drawing Sheets

FOREIGN PATENT DOCUMENTS

| | | |
|---|---|---|
| DE | 195 19 663 | 5/1996 |
| DE | 198 52 935 | 9/1999 |
| DE | 198 52 552 | 5/2000 |

* cited by examiner

Increase in the preinjection quantity

Reduction in the main injection quantity

ITDC    GTDC    ITDC    GTDC

FIG.11

METHOD FOR OPERATING AN INTERNAL COMBUSTION ENGINE

This is a Continuation-in-Part Application of international patent application PCT/EP2004/00829 filed Sep. 3, 2004 and claiming the priority of German application 103 44 428.9 filed Sep. 25, 2003.

BACKGROUND OF THE INVENTION

The invention relates to a method for operating an internal combustion engine with direct fuel injection using a pre-injection fuel amount and a main injection fuel amount.

By way of example, DE 195 19 663 A1 discloses a method for operating an internal combustion engine with spontaneous ignition, in which in a first stage a homogenous, precompressed fuel/air mix which is not suitable for spontaneous ignition is provided in the working space, and in a second stage an additional quantity of the same fuel is injected into the working space in order to bring about the spontaneous ignition. In this case, the fuel/air mix is prepared by means of external mix formation and introduced into the working space, where it is compressed to close to the spontaneous ignition point. The injection of the additional quantity of fuel in the second stage takes place in finely atomized form, avoiding contact with the walls, so as to form a mix cloud in which, on the one hand, the fuel/air ratio is no greater than the stoichiometric mixing ratio and in which, on the other hand, the spontaneous ignition is achieved.

Furthermore, DE 198 52 552 C2 discloses a method for operating a four-stroke internal combustion engine which, at part load, forms a lean base mix from air, fuel and retained exhaust gas and, at full load, forms a stoichiometric mix. At part load, compression ignition takes place, whereas at full load spark ignition takes place. Furthermore, mechanically controlled exhaust-gas retention with switchable valve closure overlap and exhaust gas throttling is provided. An activation injection can be carried out into the retained exhaust gas. The quantity of retained exhaust gas, with the valve closure overlap activated, is controlled or preset as a function of the engine speed and engine load by an exhaust-gas throttle valve which is active for all the combustion chambers. The pressure present upon opening of the intake valves is equalized for the individual combustion chambers by a cylinder-selective, cycle-consistent activation injection.

A method for operating a four-stroke, reciprocating-piston internal combustion engine is also known from DE 198 10 935 A1. It is characterized by a homogenous, lean base mix of air, fuel and retained exhaust gas and by compression ignition and direct injection of the fuel into the combustion chamber. The volume of the combustion chamber changes cyclically. The combustion chamber can be filled with fresh gas through at least one intake valve, while the combustion exhaust gases can be at least partially expelled through at least one exhaust valve. In the part-load range and in the lower full-load range, the internal combustion engine is operated with compression ignition and preferably mechanically controlled exhaust-gas retention, whereas in the full-load range and high part-load range it is operated on the spark ignition cycle.

One drawback of the methods known from the above-mentioned documents is in particular that the temperature and the composition of the working gas change in the event of changes in load. The reactivity of the mix during compression ignition is likewise altered as a result, even to the extent of causing misfires if the working gas temperatures are too low.

It is therefore the object of the invention to provide a method for operating an internal combustion engine in which the changes in the working gas temperature and composition in the event of load changes can be taken into account and/or corrected.

SUMMARY OF THE INVENTION

In a method for operating an internal combustion engine in which the fuel is injected into a combustion chamber of a pre-injection and a main injection quantity, the quantity of fuel for the pre-injection, which is selected depending on the combustion location, is injected before the top dead center of the gas exchange, and the fuel for the main injection is injected synchronously with the induction of the air. The method is used in connection with internal combustion engines, in particular for passenger and commercial motor vehicles.

The method according to the invention is distinguished by the fact that the mass of fuel to be injected is divided into pre-injection and main injection fuel quantities. The pre-injection takes place before the top dead center of the gas exchange, depending on the operating state of the internal combustion engine, and the main injection takes place synchronously with the induction. Targeted changes in the division of the fuel injection into pre-injection and main injection of this nature make it possible to effectively correct changes in the mix reactivity in the event of load changes.

In a particular configuration of the invention, the quantity of fuel to be injected is divided between the partial injections, with the quantity distribution being dependent on the operating state of the internal combustion engine. In a preferred embodiment of the invention, the division of the injected fuel masses into pre-injection and main injection quantities is approximately 50:50.

In a further configuration of the invention, in the event of a load change, the fuel quantity distribution for the pre-injection and main injection is altered in such a way as to establish a cyclical combustion process.

In a further configuration of the invention, during load changes the valve closure overlap remains constant or can only vary to a limited extent when setting the combustion.

The invention will become more readily apparent from the following description thereof on the basis of the accompanying drawings:

DESCRIPTION OF PARTICULAR EMBODIMENTS

The driving factor behind research and development in internal combustion engines is the desire to constantly improve fuel consumption while, at the same time, reducing emission levels. In the case of externally ignited internal combustion engines, in particular alternative load control methods are recommended to increase the part-load efficiency. The most important development trends are the stratified direct fuel injection, which with the aid of quality control moves the externally ignited internal combustion engines closer to the spontaneously igniting internal combustion engines (diesel engine), and the variable valve timing gear combined with residual exhaust gas strategies, which are intended to limit charge exchange losses. Both methods theoretically promise major benefits but are thwarted in one case by the expensive after-treatment of the exhaust gas from the super-stoichiometric mix and in the other case by the limited residual exhaust gas compatibility of externally ignited internal combustion engines. The ideal is a link between the two methods: a quality-controlled internal combustion engine with high residual exhaust gas contents and spontaneous ignition, which, on account of homogenous combustion, in super-stoichiometric operation emits very little if any nitrogen oxide.

One property of homogeneous combustion methods is the spontaneous ignition time, which is determined by the temperature or mix composition. If the required charging temperatures are realized with the aid of exhaust-gas retention, more specifically by means of the parameters exhaust-gas temperature and quantity, the result is that the combustion position of cycle n is dependent on the preceding cycle (n-1); the required spontaneous ignition temperature is not reached in extreme circumstances. The combustion position for its part is the determining factor for the target variables of the internal combustion engine and therefore must have values which are defined as a function of load and engine speed.

It is an object of the invention to provide ways of implementing the changes in exhaust-gas quantity and temperature which are required when of the engine operating point changes in the part-load range with ignition combustion without adversely affecting the combustion process.

Exhaust-gas retention can in principle be achieved with the aid of suitable valve control times. This requires firstly early closing of the exhaust valve, in order to keep the required quantity of residual exhaust gas in the combustion chamber of the internal combustion engine. To prevent the hot exhaust gas from flowing back into the induction pipe, with the ensuing cooling effects and charge losses, at the intake valve is also opened later. However, this concept cannot be applied to conventional, externally ignited internal combustion engines without further measures.

If this valve closure overlap is sufficiently variably, a first control capability is obtained for this form of providing the required temperature. The requirement for an unaffected high-pressure part and therefore optimum charging in this case, however, requires the use of a fully variable valve gear.

Returning to the conventional camshaft, the setting of a defined exhaust-gas retention rate remains the job of the camshaft actuators which are already in widespread series use. As an undesirable side-effect, with a rigid cam contour, the angle at which the valve opens changes with the angle at which the valve closes, which leads to charging and efficiency losses and not least to a restricted operating range in terms of load and engine speed.

In addition to the control of the temperature at the end of compression with the aid of the exhaust-gas retention rate or quantity, the use of the direct injection and the operation of the internal combustion engine with excess air also influences the working gas temperature and/or the mix composition of the fuel. The effect of the direct injection can in this case be divided into two mechanisms: firstly, a thermal effect, which provides an increase in the working gas temperature as a result of the conversion of the pre-injected fuel, and secondly the occurrence of a preconditioning of the fuel, which increases the reactivity of the latter and therefore influences the integral ignition delay.

Figure 1:
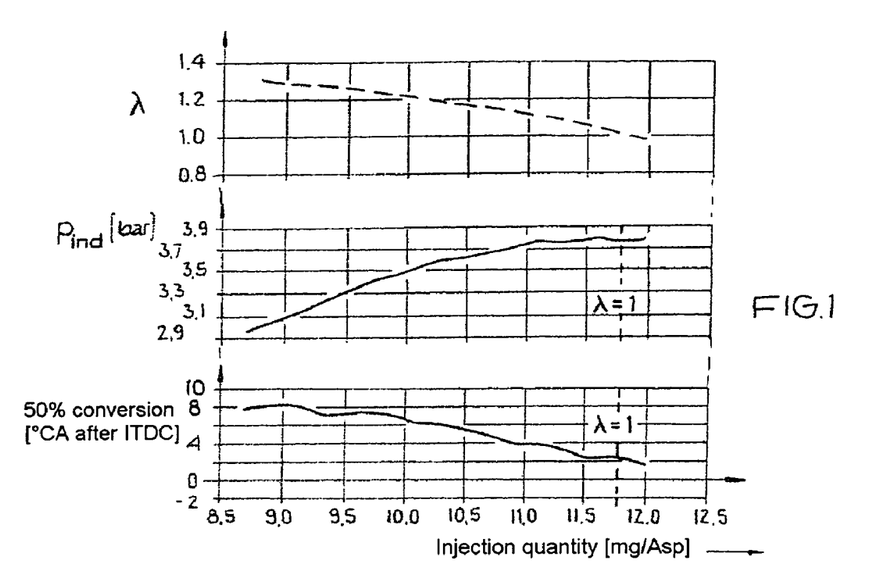
FIG. 1 shows a diagram illustrating the air/fuel ratio, indicated mean effective pressure and combustion position as a function of the injection quality.

To provide a better understanding of the method according to the invention, FIG. 1 shows a diagram illustrating the air/fuel ratio, the indicated mean effective pressure and the combustion position as a function of the injection quantity.

To determine the influence of the load on the chamber ignition combustion, starting from a reference point of the internal combustion engine (2000 rpm and 3 bar $p_{mi}$), the injection quantity is increased with otherwise constant boundary conditions. As can be seen from FIG. 1, there is a linear relationship between the air/fuel mix and the injected fuel quantity. Therefore, under the selected boundary conditions, in particular with constant control times, the intake fresh air mass remains constant irrespective of load. The load ($p_{mi}$) initially rises linearly but later rises only sub-proportionally. This deterioration in efficiency with a relatively rich mix results from a drop in the degree of conversion and from the excessively early combustion position. The deterioration in the conversion, which manifests itself in particular in a rise in the CO emissions, results from the combination of exhaust-gas retention and direct injection. If the fuel is introduced directly into the combustion chamber of the internal combustion engine, under the precondition of more or less extensive stratification between residual gas and fresh charge, mixing with exhaust gas is inevitable or at least highly probable. With rich air/fuel ratios, the oxygen content in the exhaust gas also drops and the fuel which is provided there can then no longer be fully oxidized. The visible shift in the combustion position toward an early position results from the increase in exhaust-gas temperatures. If the conversion deteriorates and therefore the exhaust-gas temperatures drop despite a further increase in the injection quantity, the shift in the combustion position also ceases.

Figure 2:
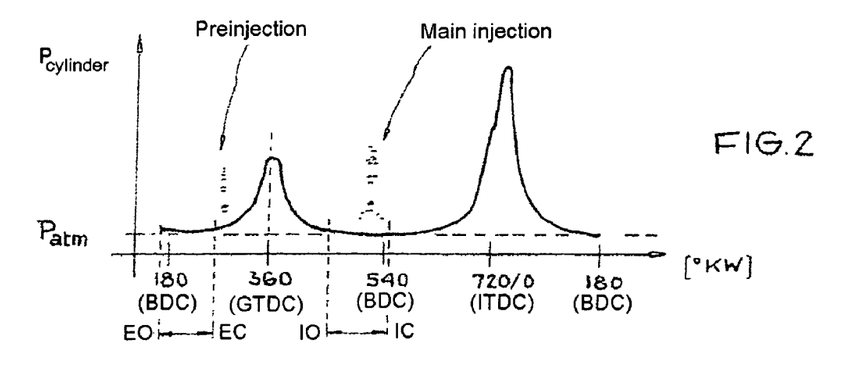
FIG. 2 shows a graph explaining the division of the injection quantity between preinjection and induction-synchronous main injection.

With the restricted variability and dynamics of the mechanical valve gear with a fixed cam contour, the injection point or the division of the injection quantity between various injection points becomes the most important parameter in the control of the combustion position. FIG. 2 illustrates the division of the injection quantity between pre-injection and induction-synchronous main injection.

The valve closure overlap in this case allows an injection prior to the gas exchange TDC. The main fuel quantity continues to be introduced synchronously with the induction.

Figure 3:
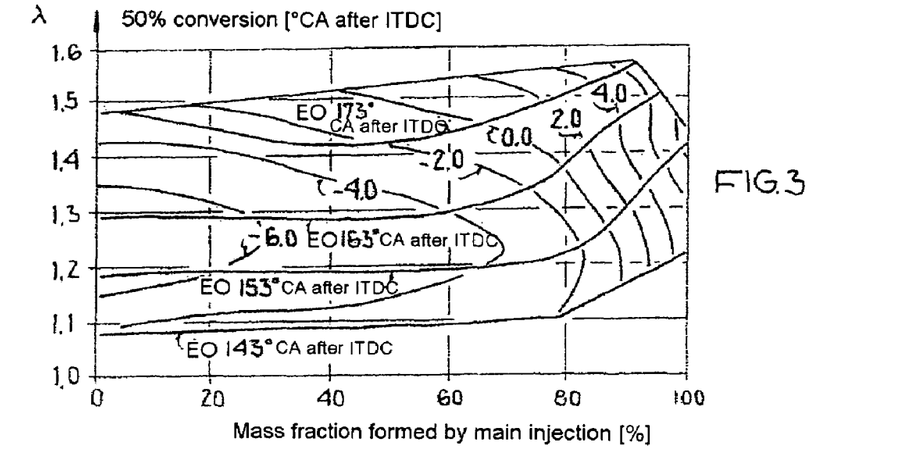
FIG. 3 shows a diagram illustrating the combustion position as a function of the injection quantity division and the air/fuel ratio.

FIG. 3 shows the way in which the combustion position is dependent on the abovementioned injection division. At the reference point (2000 rpm, approx. 3 bar $p_{mi}$), the test was carried out for various valve closure overlaps, which were kept constant over each variation. In this context, dashed lines denote constant exhaust control times. If one of these lines is followed, the result, in the optimum situation, is a shift in the combustion position by over 10° crank angle simply by changing the division. Moreover, it will be noticed that with a constant intake and exhaust phase position, higher air/fuel ratios are reached with a smaller pre-injected fuel quantity.

Figure 4:
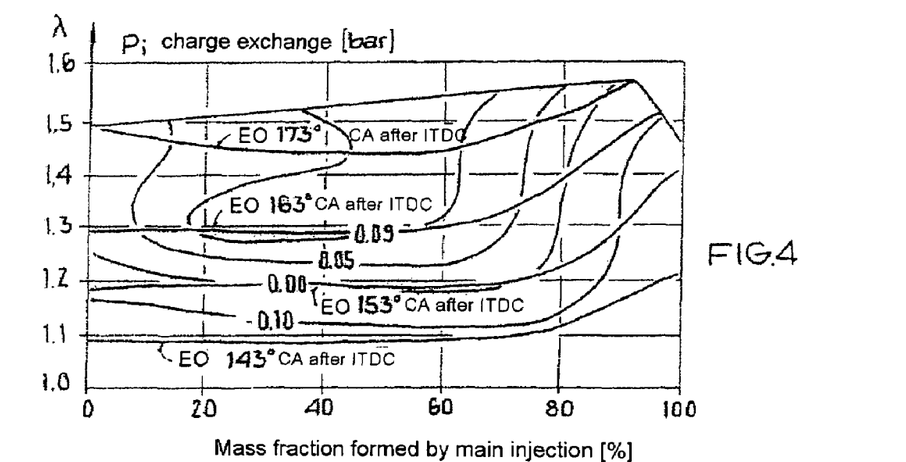
FIG. 4 shows a diagram illustrating the charge exchange mean pressure as a function of the injection quantity division and the air/fuel ratio.

The changes in the air/fuel ratio results from a change in the intake fresh air mass, since the total injection quantity is kept constant. The shift in the combustion position is therefore closely associated with the operations which take place in the charge exchange loop. A glance at the charge exchange mean effective pressure in FIG. 4, measured from BDC to BDC, shows that given an approximately even division in the injection quantity between pre-injection and main injection and high air/fuel ratios, positive values are obtained for the charge exchange work, even though the signs of the latter ought actually to be negative on account of induction, exhaust and wall heat losses. The injection of the fuel into the hot exhaust gas, which at the gas exchange TDC has a sufficiently high temperature level for spontaneous ignition and moreover is equipped with residual oxygen on account of the super-stoichiometric operation, allows conversion to be assumed.

Conclusions as to the mechanisms of this conversion can be taken from FIGS. 5a to 5f below. Starting from the point with the maximum charge exchange work from the engine performance graph shown above with a division of 50:50 and $\lambda \approx 1.4$, the air/fuel ratio $\lambda$ was increased by supercharging.

Figure 5A:
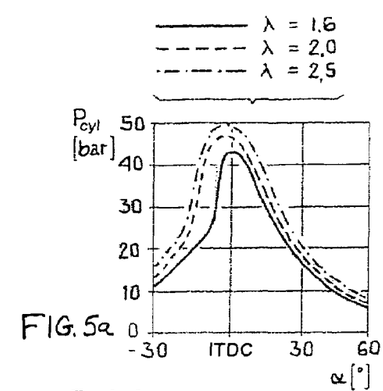
FIGS. 5a to 5f show graphs illustrating the pressure, temperature and heating curve in the ignition and gas exchange TDC as a function of the air/fuel ratio.
Figure 5B:
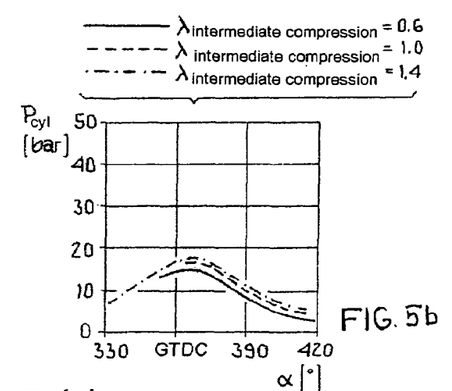
Figure 5C:
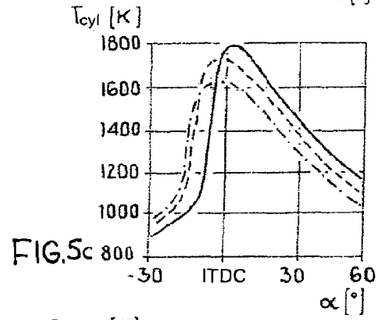
Figure 5D:
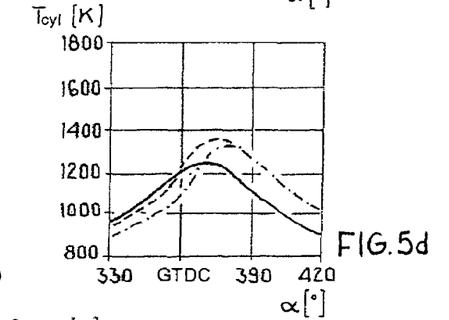
Figure 5E:
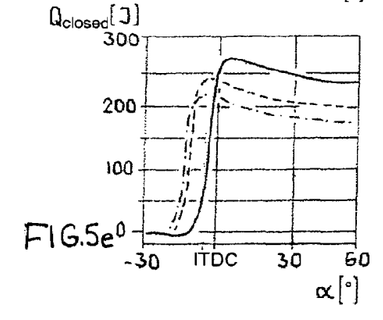
Figure 5F:
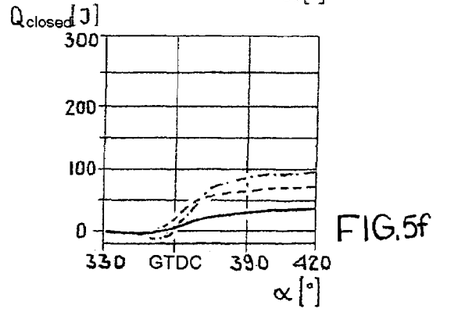

First, in the non-supercharged state, the conversion can be recognized in the asymmetric pressure and temperature curve (FIG. 5b). Both maxima lie after the top dead center. If a heating law at the GTDC is formed using mass calculations according to fundamental thermodynamic equations, heat will be released. If the degree of charging and therefore the residual air content in the exhaust gas is now increased in steps, the degree of conversion at the charge exchange TDC rises despite otherwise constant boundary conditions, which implies a lack of oxygen. Despite the excess air generated in this way, not all of the pre-injected fuel mass can be converted. The pre-injection takes place approximately 60° CA before the gas exchange TDC, i.e. in this case mix formation problems and even the formation of carbon particulates has to be assumed. However, these carbon particulates are oxidized again in the main conversion. An improvement in the degree of conversion in the intermediate compression leads to an increase in the temperature and pressure of the retained exhaust gas. The increase in pressure even when the intake valve is opened also explains the drop in the air/fuel ratio with large pre-injection quantities in the situation shown above. This higher temperature level which is now required leads to an early shift in the combustion. However, since a proportion of the fuel, which becomes ever greater according to the degree of charging, is already being burnt at the GTDC, the main conversion is always lower. The exhaust-gas temperature therefore drops and in turn influences the conversion in the intermediate compression.

Given the knowledge of the influence of load and engine speed on the parameters determining combustion, such as air consumption, exhaust-gas temperature and exhaust-gas retention rate, as well as the control variables which are present for controlling a combustion shift, such as phase position of the camshaft and division of the injection quantity, strategies for dynamically changing these variables can be determined from load/engine speed engine performance graphs produced under steady-state engine operating conditions.

Figure 6:
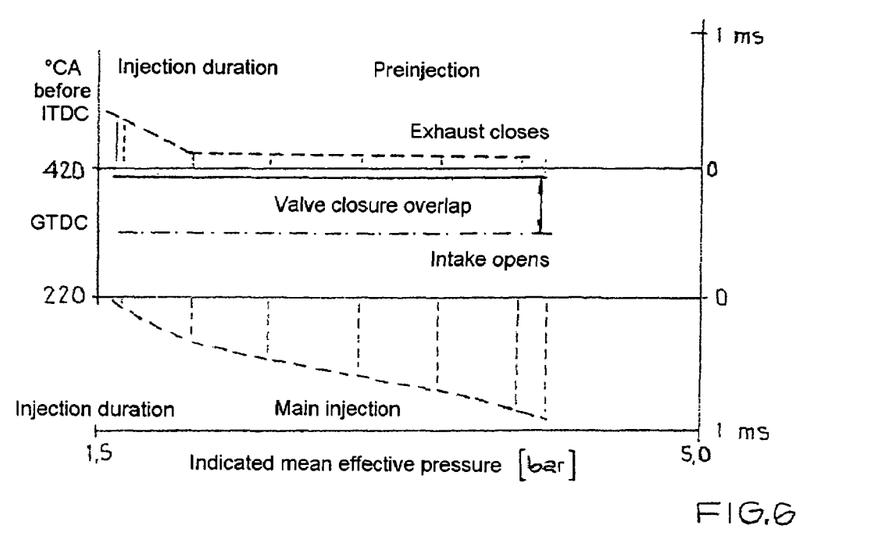
FIG. 6 shows a diagram explaining the quick-adjustment strategy for increasing the load at a constant engine speed.

The final speed of the in this case hydraulic camshaft actuators may now restrict the usability of this variant. Rapid, cyclical load changes have to be realized in a different way. FIG. 6 shows how the indicated mean effective pressure and the corresponding combustion position can only be set with the aid of the injection quantity and its division between pre-injection and induction-synchronous main injection. The mode of operation of the pre-injection has already been dealt with above. It is based on an increase in the exhaust-gas temperature in the intermediate compression generated by the valve closure overlap as a result of a conversion of the pre-injected fuel. If the control times remain constant, as in this case, the residual gas quantity in the combustion chamber changes only slightly with the load-changed pressure when the exhaust valve opens. This in turn means that both load points, i.e. the current load point and the new load point to be set, differ only by virtue of the exhaust-gas temperature level during the first phase of the charge exchange. The level is adapted with the aid of the pre-injection and the subsequent conversion. This in turn has consequences for the load change: starting from a low load, the pre-injection fuel quantity initially has to be kept constant. The increase in the induction-synchronous main fuel injection quantity, after the high-pressure part with combustion, leads to an increase in the exhaust-gas temperature. In order to produce the same conditions again when the intake valve is opened for the next cycle, the preinjection quantity now has to be reduced. This reduces the conversion in the intermediate compression. The same applies in the opposite direction for a reduction in load. This strategy can only take place cyclically for as long as the load fraction applied by the conversion in the charge exchange is relatively low. Otherwise, the newly set load is only correctly set after two cycles.

Within the operating range covered by the chamber ignition combustion, cyclical load changes can be carried out using the strategy described above at various engine speeds. A change in indicated mean effective pressure and combustion position is in this case provided only by means of the injection quantity and its division, while maintaining the valve closure overlap.

Figure 7:
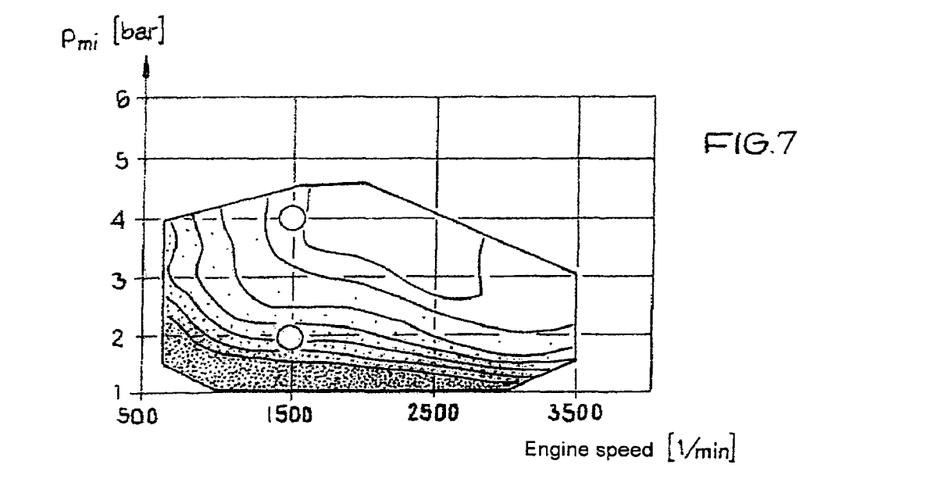
FIG. 7 shows a graph assigning the load change to the engine performance graph covered by the spatial ignition combustion.

FIG. 7 illustrates, by way of example, a load change at 1500 rpm. The load change is implemented in two variants: in the first variant, first, the pre-injection quantity is adjusted; then the fuel quantity introduced during the induction of air into the combustion chamber is adjusted based on the values known from the steady state engine operation. The second variant follows the requirements presented above for approximately constant conditions when the intake valve is opened and therefore initially involves adapting the load by means of the main fuel injection. The exhaust-gas temperature only has to be set in the subsequent cycle, by changing the pre-injection quantity.

Figure 8A:
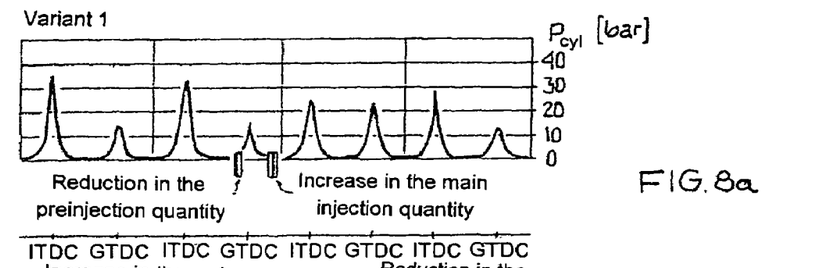
FIG. 8 shows a crankshaft-resolved illustration of two load change variants.
Figure 8B:
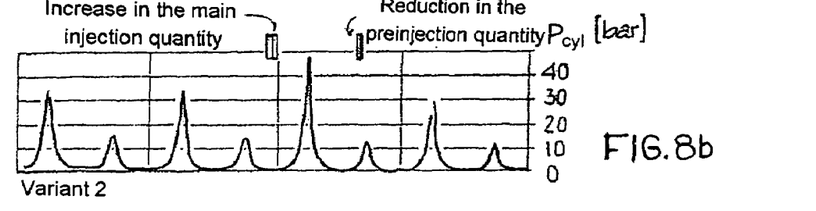

FIGS. 8a and 8b illustrate the two operations involved in a load increase. In this case, as can be seen from the FIG. 8a, first the pre-injection quantity is reduced, before the main injection quantity is increased after the intermediate compression. FIG. 8b illustrates how, according to the second variant, first the main injection quantity is increased, and therefore the load in the high-pressure part is increased. After the subsequent discharging of the exhaust gas, the pre-injection quantity is reduced.

Figure 9:
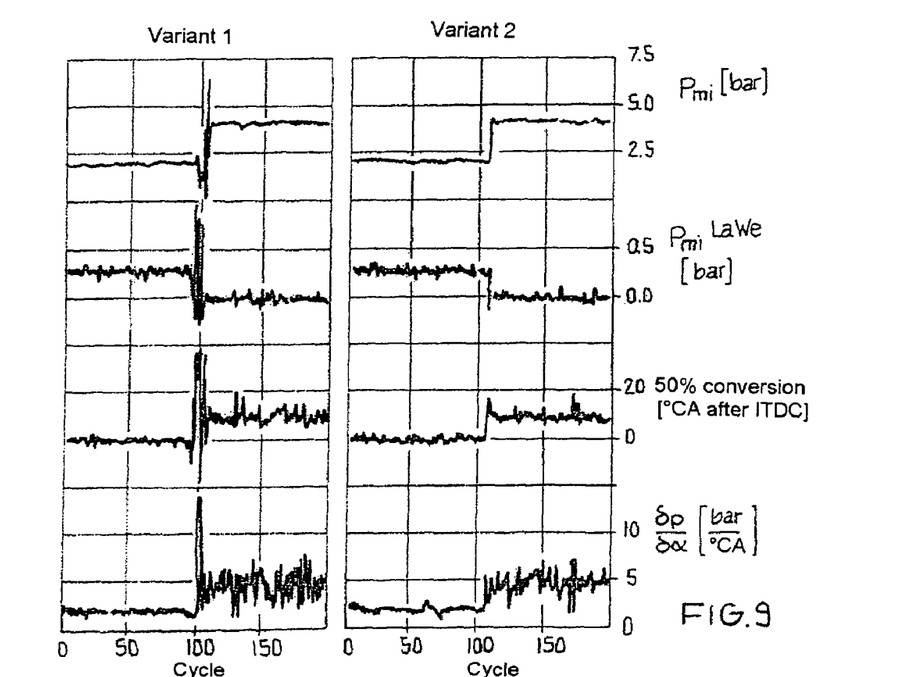
FIG. 9 shows two variants of a cyclically resolved illustration of the integral indication variables during the load change.

FIG. 9 illustrates the behavior of the integral indication measurement variables during the load change for both variants. The combustion misfiring which are expected to occur in the first variant are illustrated in the curve of the indicated mean effective pressure. In the second variant, the load change is completed without combustion misfiring. The use of an ignition spark as auxiliary ignition can assist the combustion to be resumed following the combustion misfiring. After a few uncontrolled combustion processes, the steady-state chamber ignition combustion state is established again. The other integral variables show that the steady-state mean values are established immediately after the load change, assuming misfire-free operation. The different levels of conversion in the intermediate compression for the two load stages also change cyclically and are stable.

Figure 10A:
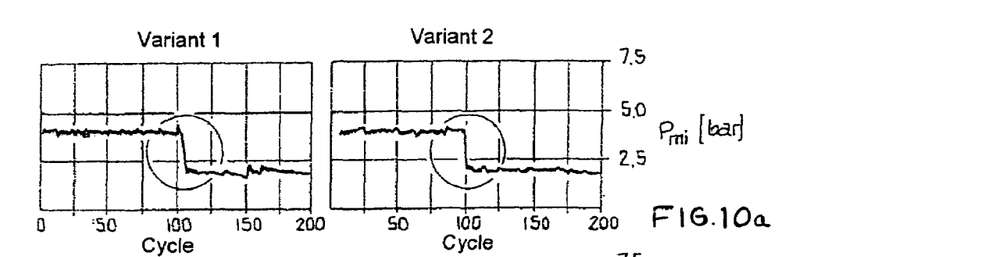
FIGS. 10a and 10b show illustrations of the indicated mean effective pressure during a reduction in load.
Figure 10B:
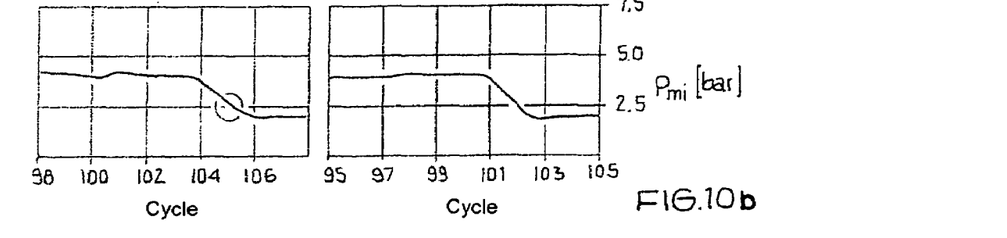
Figure 11:
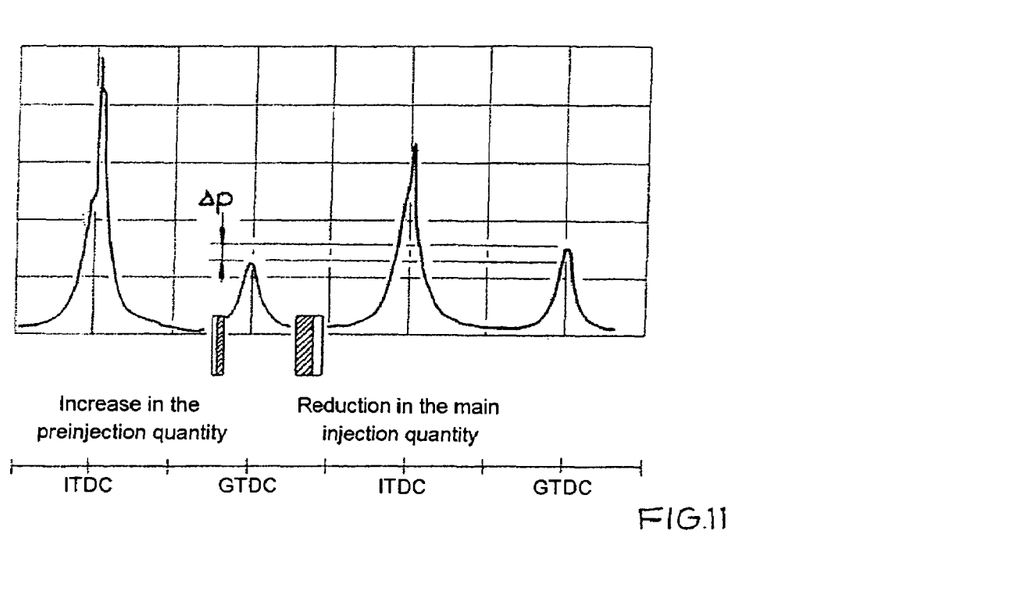
FIG. 11 shows an illustration of the crankshaft-resolved combustion chamber pressure during the reduction in load.

The load change from the higher load to the lower load can be applied for both variants. Only the illustration on a larger scale presented in FIG. 10 shows, in the circled area, a cycle with a higher indicated mean effective pressure after the reduction in load for the first variant. The cause of this is the difference in the pressure level of the exhaust-gas intermediate compression between the two load stages, as can be recognized from FIG. 11. The difference means that given a constant injection pressure, constant start of injection and constant injection duration, more fuel enters the combustion chamber. This leads to an increase in the mean effective pressure compared to the steady-state values.

What is claimed is:

1. A method for operating a four-stroke internal combustion engine, wherein, to provide a cylinder charge:

fuel is injected directly into at least one combustion chamber of the internal combustion engine, the volume of which changes cyclically, fresh gas is supplied to the combustion chamber through at least one intake valve and exhaust gas is discharged through at least one exhaust valve, during part-load operation, a lean base mix of air, fuel and retained exhaust gas is formed, and during full load operation a stoichiometric mix is formed, compression ignition takes place during part-load engine operation and spark ignition takes place during full load engine operation, and the fuel quantity is supplied to the combustion chamber in a pre-injection step in the form of a pre-injection fuel quantity and during a main injection step in the form of a main injection fuel quantity, said method comprising the steps of injecting fuel during part-load operation, in which compression ignition takes place in the pre-injection step, before the top dead center of the gas exchange depending on the location of a center of combustion of the cylinder charge, and injecting the main fuel quantity synchronously with the induction of the fresh gas into the cylinder.

2. The method as claimed in claim 1, wherein the quantity ratio of the fuel quantity injected in the pre-injection step and the fuel quantity injected in the main injection step is divided according to the operating state of the internal combustion engine.

3. The method as claimed in claim 1, wherein, in the event of a load change from a low load to a high load, initially the pre-injection quantity remains constant, then the quantity of the main injection is increased, which increases the exhaust-gas temperature, and subsequently the quantity of the pre-injection is reduced in order to obtain a cyclical combustion process.

4. The method as claimed in claim 3, wherein, during a load change, the valve closure overlap setting of the intake and exhaust valves is invariable or only variable to a limited extent.

5. The method as claimed in claim 1, wherein the division of the injected fuel quantities into pre-injection and main injection quantities is approximately 50:50.

* * * * *